(12) United States Patent
Park et al.

(10) Patent No.: US 11,050,861 B2
(45) Date of Patent: *Jun. 29, 2021

(54) METHOD AND APPARATUS FOR ENCODING AND DECODING PACKET

(71) Applicant: Samsung Electronics Co., Ltd., Suwon-si (KR)

(72) Inventors: Chang Soon Park, Chungju-si (KR); Young Jun Hong, Seoul (KR); Youngsoo Kim, Seoul (KR); Hyosun Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,195

(22) Filed: Nov. 7, 2019

(65) Prior Publication Data
US 2020/0076930 A1 Mar. 5, 2020

Related U.S. Application Data

(63) Continuation of application No. 15/936,650, filed on Mar. 27, 2018, which is a continuation of application (Continued)

(30) Foreign Application Priority Data

Mar. 14, 2014 (KR) .................. 10-2014-0030435
Mar. 4, 2015 (KR) .................. 10-2015-0030298

(51) Int. Cl.
*H04L 29/06* (2006.01)
*H04L 1/00* (2006.01)
*H04W 28/18* (2009.01)

(52) U.S. Cl.
CPC ............ *H04L 69/22* (2013.01); *H04L 1/0009* (2013.01); *H04L 1/0025* (2013.01); *H04L 1/0075* (2013.01); *H04W 28/18* (2013.01)

(58) Field of Classification Search
CPC ..... H04L 1/0009; H04L 1/007; H04L 1/0071; H04L 1/0072; H04L 27/12; H04L 27/14; H04L 1/0054; H04L 1/0059
See application file for complete search history.

(56) References Cited

U.S. PATENT DOCUMENTS 7,164,650 B2   1/2007 Kim et al.
8,036,225 B1   10/2011 Pawar et al.
(Continued)

FOREIGN PATENT DOCUMENTS

JP   2005-151109 A   6/2005
JP   3751945 B2      3/2006
(Continued)

OTHER PUBLICATIONS

Naagesh S. Bhat, Design and Implementation of IEEE 802.15.4 Mac Protocol on FPGA, International Journal of Computer Applications (IJCA). (Year: 2011).*
(Continued)

*Primary Examiner* — Oussama Roudani
(74) *Attorney, Agent, or Firm* — NSIP Law

(57) ABSTRACT

A method of a transmitter transmitting a packet encoded by applying a coding scheme based on a wireless channel environment to a receiver, and a method of the receiver detecting the coding scheme applied to the encoded packet and decoding the packet, in which the transmitter applies a spreading factor corresponding to the coding scheme to a preamble of the packet, and the receiver decodes the packet by detecting the coding scheme using the preamble.

8 Claims, 21 Drawing Sheets

Related U.S. Application Data

No. 14/658,995, filed on Mar. 16, 2015, now Pat. No. 10,015,290.

(56) References Cited

U.S. PATENT DOCUMENTS

| | | |
|---|---|---|
| 8,359,530 B2 | 1/2013 | Sawai et al. |
| 2003/0081692 A1 | 5/2003 | Kwan et al. |
| 2004/0204101 A1 | 10/2004 | Qiu et al. |
| 2005/0185669 A1* | 8/2005 | Welborn ............... H04W 48/18 370/465 |
| 2005/0201287 A1* | 9/2005 | Welborn ............ H03H 17/0254 370/235 |
| 2006/0003710 A1 | 1/2006 | Nakagawa et al. |
| 2006/0285580 A1 | 12/2006 | Kinnunen et al. |
| 2006/0285582 A1 | 12/2006 | Sumasu et al. |
| 2008/0101305 A1 | 5/2008 | Cave et al. |
| 2009/0060005 A1* | 3/2009 | Rouphael ............ H04B 7/2628 375/146 |
| 2009/0168939 A1* | 7/2009 | Constantinidis .... H04W 52/028 375/359 |
| 2009/0274195 A1* | 11/2009 | Chang .................. H04J 13/004 375/145 |
| 2010/0128660 A1 | 5/2010 | Becker et al. |
| 2010/0272159 A1 | 10/2010 | Lim et al. |
| 2011/0096810 A1* | 4/2011 | Suehiro ................ H04B 1/7103 375/130 |
| 2011/0261904 A1 | 10/2011 | Seier et al. |
| 2012/0163480 A1* | 6/2012 | Nemeth ................ H04B 1/707 375/259 |
| 2012/0263107 A1 | 10/2012 | Taghavi Nasrabadi et al. |
| 2013/0058360 A1* | 3/2013 | Oh ......................... H04L 1/007 370/474 |
| 2013/0215985 A1 | 8/2013 | Lee et al. |
| 2013/0242950 A1 | 9/2013 | Proctor, Jr. |
| 2013/0250904 A1 | 9/2013 | Kang et al. |
| 2013/0272258 A1 | 10/2013 | Lee et al. |
| 2014/0293887 A1 | 10/2014 | Kumar et al. |
| 2016/0081101 A1 | 3/2016 | Yu |

FOREIGN PATENT DOCUMENTS

| | | |
|---|---|---|
| JP | 2010-517464 A | 5/2010 |
| KR | 10-2001-0092451 A | 10/2001 |
| KR | 10-2007-0061925 A | 6/2007 |
| KR | 10-2007-0091138 A | 9/2007 |
| KR | 10-2014-0015652 A | 2/2014 |
| WO | WO 2004/114549 A1 | 12/2004 |
| WO | WO 2013/085362 A1 | 6/2013 |

OTHER PUBLICATIONS

Muszynski, Peter et al., "Introduction to WCDMA", *WCDMA for UMTS—Radio Access for Third Generation Mobile Communications 3*, Sep. 2003, (pp. 47-52).

Bynam, Kiran et al., "Samsung's Physical Layer Proposal", Proceedings of: Project: *IEEE P802.15 Working Group for Wireless Personal Area Networks (WPANs)*, Nov. 2013. (30 pages in English).

3GPP, a Global Initiative, "Universal Mobile Telecommunications System (UMTS); Spreading and modulation (FDD)", (*3GPP TS 25.213 version 11.4.0 Release 11*), *European Telecommunications Standards Institute*, Jan. 2013 (50 pages in English).

International Search Report dated May 21, 2015 in corresponding International Application No. PCT/KR2015/002503 (3 pages in English).

European Search Report dated Oct. 19, 2017 in corresponding European Patent Application No. 15762363.8 (16 pages in English).

European Search Report dated Mar. 21, 2018 in corresponding European Patent Application No. 15762363.8 (2 pages in English).

Japanese Office Action dated Feb. 12, 2019 in corresponding Japanese Patent Application No. 2016-557215 (4 pages in English, 7 pages in Japanese).

\* cited by examiner

FIG. 8

| PREAMBLE FORMAT | SPREADING FACTOR | NUMBER OF REPETITIONS ($N_{rep}$) | BASE PREAMBLE SEQUENCE |
|---|---|---|---|
| P2 | 4 | 4 | [ 1  0  0  1  1  0  0  1<br>  1  0  0  1  1  0  0 -1<br> -1  0  0  1 -1  0  0  1<br> -1  0  0  1 -1  0  0 -1] |
| P3 | 8 | 8 | [ 1  0 -1  0  0 -1  0 -1<br>  1  0  1  0  0 -1  0  1<br>  1  0  1  0  0 -1  0  1<br> -1  0  1  0  0  1  0  1] |

FIG. 9

| SPREADING FORMAT | SPREADING FACTOR | BIT | SPREADING SEQUENCE FOR SFD AND PHR |
|---|---|---|---|
| S2 | 4 | 1 | [ 1 0 0 1 ] |
| S2 | 4 | 0 | [ 0 -1 -1 0 ] |
| S3 | 8 | 1 | [ 1 0 -1 0 0 -1 0 1 ] |
| S3 | 8 | 0 | [ 0 -1 0 1 1 0 -1 0 ] |

FIG. 11

| { PHR9, PHR8 } | MODULATION SCHEME |
|---|---|
| { 0, 0 } | 1/1-TOOK |
| { 0, 1 } | 2/4-TOOK |
| { 1, 0 } | 3/8-TOOK |
| { 1, 1 } | 5/32-TOOK |

FIG. 12

| { PHR10 } | CODING SCHEME |
|---|---|
| { 0 } | BCH |
| { 1 } | RESERVED |

FIG. 13

| PSDU FORMAT | MODULATION SCHEME | MODULATION DUTY CYCLE | INTERLEAVER DEPTH (d) | M (BITS PER SYMBOL) | L (CHIPS PER SYMBOL) | DATA RATE AT 2.4 GHz (kbps) | DATA RATE AT 900 MHz (kbps) | PREAMBLE FORMAT | SFD/PHR SPREADING FORMAT |
|---|---|---|---|---|---|---|---|---|---|
| D1 | 1/1-TOOK | 0.50 | 1 | 1 | 1 | 809.5 | 485.7 | P3 | S3 |
| D2 | 2/4-TOOK | 0.25 | 2 | 2 | 4 | 404.8 | 242.8 | P3 | S3 |
| D3 | 3/8-TOOK | 0.50 | 3 | 3 | 8 | 303.5 | 182.14 | P3 | S3 |
| D6 | 5/32-TOOK | 0.50 | 5 | 5 | 32 | 126.5 | 75.9 | P3 | S3 |

FIG. 14

| PSDU FORMAT | MODULATION SCHEME | MODULATION DUTY CYCLE | INTERLEAVER DEPTH (d) | M (BITS PER SYMBOL) | L (CHIPS PER SYMBOL) | DATA RATE AT 2.4 GHz (kbps) | DATA RATE AT 900 MHz (kbps) | PREAMBLE FORMAT | SFD/PHR SPREADING FORMAT |
|---|---|---|---|---|---|---|---|---|---|
| D8 | 1/1-TOOK | 0.50 | 1 | 1 | 1 | 889 | 533.33 | P2 | S2 |
| D9 | 2/4-TOOK | 0.25 | 1 | 2 | 4 | 444.5 | 266.66 | P2 | S2 |

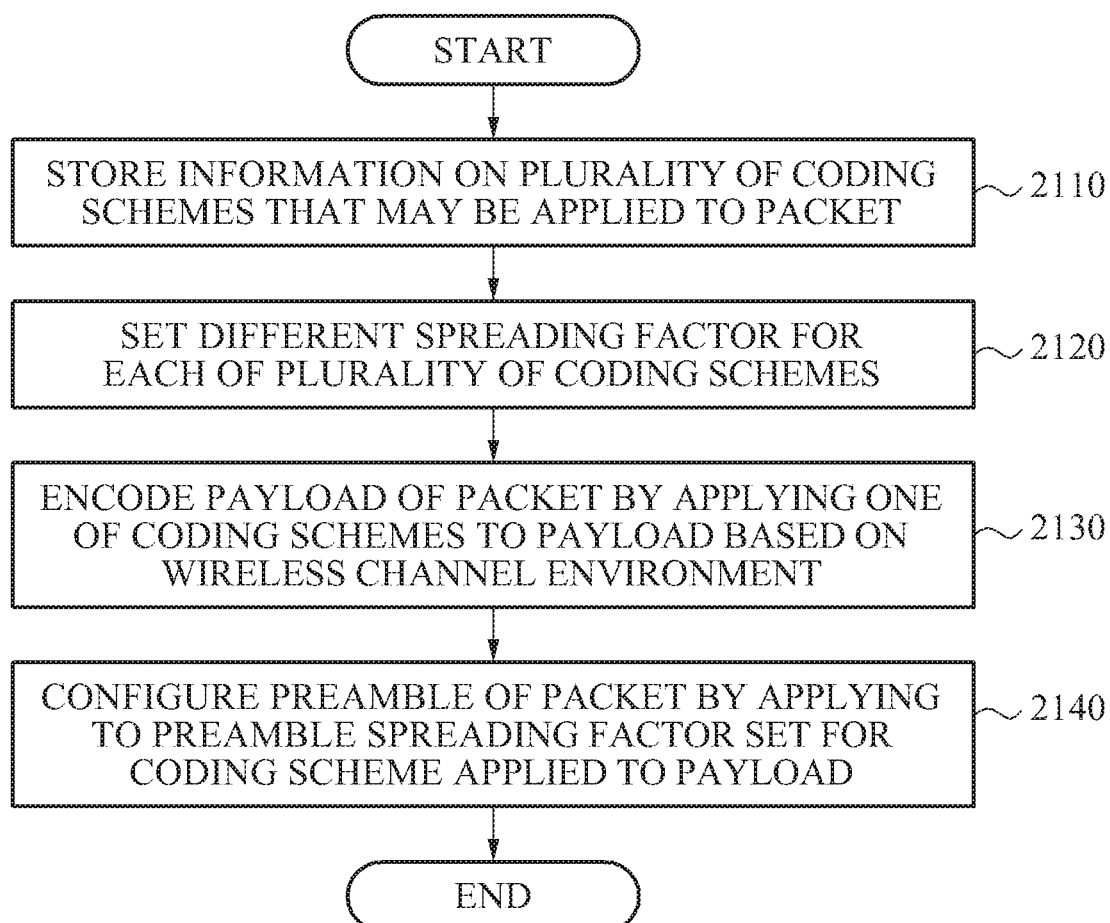

METHOD AND APPARATUS FOR ENCODING AND DECODING PACKET

CROSS-REFERENCE TO RELATED APPLICATIONS

This application is a continuation of U.S. patent application Ser. No. 15/936,650 filed on Mar. 27, 2018 which is a continuation of U.S. patent application Ser. No. 14/658,995 filed on Mar. 16, 2015, now U.S. Pat. No. 10,015,290 issued on Jul. 3, 2018, which claims the benefit under 35 USC 119(a) of Korean Patent Application Nos. 10-2014-0030435 filed on Mar. 14, 2014, and 10-2015-0030298 filed on Mar. 4, 2015, in the Korean Intellectual Property Office, the entire disclosures of which are incorporated herein by reference for all purposes.

BACKGROUND

1. Field

The following description relates to a method and an apparatus for encoding and decoding a packet using a preamble.

2. Description of Related Art

Recently, various types of multimedia content have been generated, and thus a total amount of content is increasing in a broadcasting and communication environment. Also, high capacity content, for example, high definition (HD) content and ultra high definition (UHD) content, are increasingly generated, and thus data congestion is intensifying. To transmit the high capacity content from a transmitter to a receiver at an increased transmission rate, a coding scheme that is used needs to based on a wireless channel environment. When the wireless channel environment permits, a coding scheme having a high code rate for data transmission may be applied.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a packet transmission method of a transmitter includes determining a coding scheme among a plurality of coding schemes based on a wireless channel environment; determining a spreading factor corresponding to the determined coding scheme; configuring a preamble of a packet by applying the spreading factor to the preamble; encoding a payload of the packet by applying the determined coding scheme to the payload; and transmitting the packet including the preamble and the payload to a receiver.

The preamble may include a base preamble sequence spread by the spreading factor.

The method may further include determining the base preamble sequence based on the spreading sequence from a plurality of base preamble sequences respectively corresponding to a plurality of spreading factors respectively corresponding to the plurality of coding schemes; and the plurality of base preamble sequences may be orthogonal.

The transmitter and the receiver may be configured to share information on the spreading factor corresponding to the determined coding scheme.

The packet may further include an indicator indicating the determined coding scheme.

The method may further include receiving feedback on the wireless channel environment from the receiver; and the determining of the coding scheme may include determining the coding scheme among the plurality of coding schemes based on the feedback.

In another general aspect, a non-transitory computer-readable storage medium stores instructions to cause a computer to perform the method described above In another general aspect, a transmitter includes a processor configured to determine a coding scheme among a plurality of coding schemes based on a wireless channel environment, determine a spreading factor corresponding to the determined coding scheme, configure a preamble of a packet by applying the spreading factor to the preamble, and encode a payload of the packet by applying the determined coding scheme to the payload; and a communicator configured to transmit the packet including the preamble and the payload to a receiver.

In another general aspect, a packet decoding method of a receiver includes receiving a packet from a transmitter; detecting a spreading factor applied to a preamble of the packet; estimating a coding scheme applied to a payload of the packet based on the spreading factor; and decoding the payload of the packet based on the estimated coding scheme.

The detecting may include detecting the spreading factor based on a base preamble sequence of the preamble.

The detecting of the spreading factor may include calculating correlation values between the preamble and a plurality of base preamble sequences respectively corresponding to a plurality of spreading factors; and detecting as the spreading factor one of the spreading factors corresponding to one of the base preamble sequences having a greatest correlation value among the correlation values.

The plurality of base preamble sequences may be orthogonal.

The estimated coding scheme may be a first coding scheme; the packet may include an indicator indicating a second coding scheme; the method may further include detecting the second coding scheme indicated by the indicator; and determining whether the first coding scheme is the same as the second coding scheme; and the decoding may include decoding the payload of the packet based on the first coding scheme in response to a result of the determining being that the first coding scheme is the same as the second coding scheme.

The method may further include determining whether an error is present in a header of the packet including the indicator; and the detecting of the second coding scheme may include detecting the second coding scheme in response to a result of the determining being that an error is not present in the header.

A weight value may be set for each of the first coding scheme and the second coding scheme in advance; and the decoding may include decoding the payload of the packet by applying a coding scheme having a greater weight value among the first coding scheme and the second coding scheme in response to a result of the determining being that the first coding scheme is not the same as the second coding scheme.

The packet may include an indicator indicating a coding scheme applied to the payload of the packet by the transmitter; the method may further include setting the indicator to a value indicating the estimated coding scheme; and determining whether an error is present in a header of the packet including the indicator set to the value indicating the estimated coding scheme; and the decoding may include decoding the payload of the packet based on the estimated coding scheme in response to a result of the determining being that an error is not present in the header.

The method may further include generating information on a wireless channel environment in which the packet was transmitted; and transmitting the information to the transmitter.

In another general aspect, a non-transitory computer-readable storage medium stores instructions to cause a computer to perform the method described above.

In another general aspect, a receiver includes a communicator configured to receive a packet from a transmitter; and a processor configured to detect a spreading factor applied to a preamble of the packet, estimate a coding scheme applied to a payload of the packet based on the detected spreading factor, and decode the payload of the packet based on the estimated coding scheme.

In another general aspect, a packet coding method includes storing information on a plurality of coding schemes that can be applied to a packet; setting a different spreading factor for each of the plurality of coding schemes; encoding a payload of the packet by applying a coding scheme among the plurality of coding schemes to the payload of the packet based on a wireless channel environment; and configuring a preamble of the packet by applying to the preamble the spreading factor set for the coding scheme applied to the payload.

In another general aspect, a packet coding method includes encoding a payload of a packet by applying to the payload a coding scheme providing a maximum throughput in a wireless channel environment in which the packet is to be transmitted among a plurality of coding schemes each having a different spreading factor; and configuring a preamble of the packet by applying to the preamble the spreading factor of the coding scheme applied to the payload.

Each of the coding schemes may further include a different set of spreading sequences corresponding to the spreading factor of the coding scheme, each of the spreading sequences corresponding to a different data value; and the encoding may include spreading data values of the payload according to corresponding spreading sequences of the set of spreading sequences of the coding scheme applied to the payload.

The spreading sequences may be orthogonal within each set of spreading sequences.

Each of the coding schemes may further include a different base preamble sequence; and the configuring may include configuring the preamble of the packet by repeating the base preamble sequence of the coding scheme applied to the payload a number of times equal to the spreading factor of the coding scheme applied to the payload.

The different base preamble sequences of the coding schemes may be orthogonal.

Other features and aspects will be apparent from the following detailed description, the drawings, and the claims.

BRIEF DESCRIPTION OF THE DRAWINGS

FIGS. 7 and 8 illustrate examples of a sequence of a preamble configured according to a spreading factor.

FIG. 9 illustrates examples of a spreading sequence for a start frame delimiter (SFD) and a physical layer header (PHR) based on a spreading factor.

FIG. 11 illustrates an example of a modulation indicator indicating a modulation scheme applied to a packet.

FIG. 12 illustrates an example of a coding indicator indicating a coding scheme applied to a packet.

FIG. 13 illustrates an example of data rates corresponding to combinations of a modulation scheme, an SFD/PHR spreading format, and a preamble format for a Bose, Chaudhuri, and Hocquenghem (BCH) scheme.

FIG. 14 illustrates an example of data rates corresponding to combinations of a modulation scheme, an SFD/PHR spreading format, and a preamble format for a single parity check (SPC) scheme.

FIG. 21 illustrates an example of a packet coding method.

DETAILED DESCRIPTION

Figure 1:
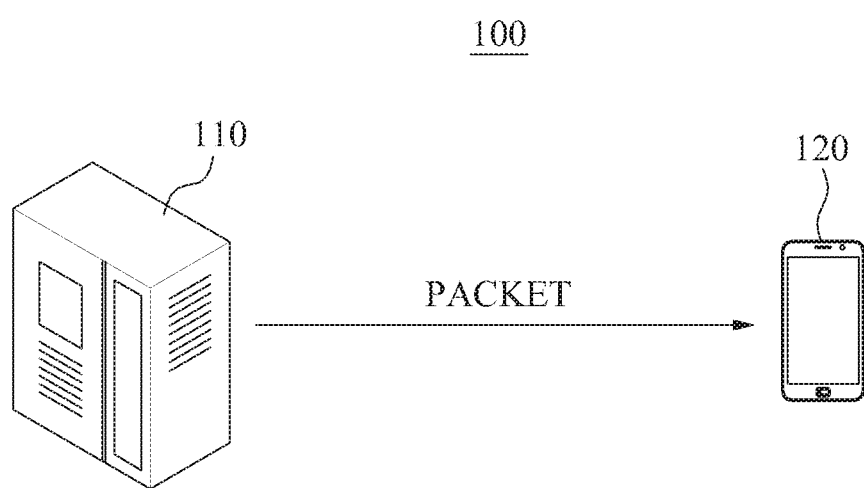
FIG. 1 illustrates an example of a packet transmission system.

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The terminology used herein is for the purpose of describing particular examples only, and is not intended to limit the scope of the disclosure in any way. As used herein, the singular forms "a," "an," and "the" are intended to include the plural forms as well, unless the context clearly indicates otherwise. It will be further understood that the terms "include" and/or "have," when used in this specification, specify the presence of stated features, numbers, operations, elements, components, or combinations thereof, but do not preclude the presence or addition of one or more other features, numbers, operations, elements, components, or combinations thereof.

Unless otherwise defined, all terms, including technical and scientific terms, used herein have the same meaning as commonly understood by one of ordinary skill in the art to which this description pertains. It will be further understood that terms, such as those defined in commonly used dictionaries, should be interpreted as having a meaning that is consistent with their meaning in the context of the relevant art and are not to be interpreted in an idealized or overly formal sense unless expressly so defined herein.

FIG. 1 illustrates an example of a packet transmission system 100.

The packet transmission system 100 includes a transmitter 110 and a receiver 120.

The transmitter 110 generates a packet including data to be transmitted to the receiver 120, and transmits the generated packet to the receiver 120 through wireless communication. Each of the transmitter 110 and the receiver 120 may be a computer, a mobile phone, a tablet, or any other electronic device capable of performing the wireless communication.

The wireless communication may be exposed to various non-ideal channel environments, including, for example, noise. A transmittable and receivable data rate and a communication reliability level will vary based on a quality of a wireless channel or a transmission and reception distance. In response to a change in a wireless channel environment, a packet may be transmitted by adopting a modulation and coding scheme (MCS) varying an error rate and the data rate. In this disclosure, the term "coding scheme" is interchangeable with the term "encoding scheme".

The receiver 120 decodes an encoded packet to obtain the data encoded in the packet. Thus, the receiver 120 detects a coding scheme applied to the packet. The transmitter 110 indicates information on the coding scheme in an uncoded field in the packet. For example, the uncoded field may be a header of the packet. However, this will increase a size of the header.

Hereinafter, a method of encoding a packet while preventing an increase in a size of a header in a packet will be described with reference to FIGS. 2 through 14.

The description about the packet encoding method provided with reference to FIGS. 2 through 14 is also applicable to a packet modulation method. Thus, in this disclosure, coding is interchangeable with modulation, and decoding is interchangeable with demodulation.

Figure 2:
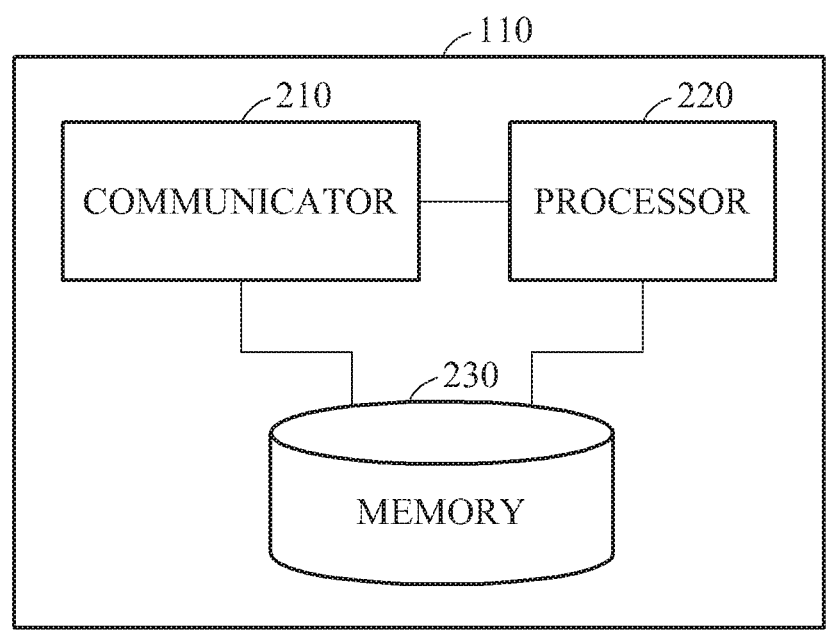
FIG. 2 illustrates an example of a configuration of a transmitter.

FIG. 2 illustrates an example of a configuration of the transmitter 110.

The transmitter 110 includes a communicator 210, a processor 220, and a memory 230.

The communicator 210 transmits a packet.

The processor 220 processes data.

The memory 230 stores a packet and data received by the communicator 210, and stores the data processed by the processor 220.

Hereinafter, the communicator 210, the processor 220, and the memory 230 will be described with reference to FIGS. 3 through 15.

The description provided with reference to FIG. 1 is also applicable to FIG. 2, but will not be repeated here for clarity and conciseness.

Figure 3:
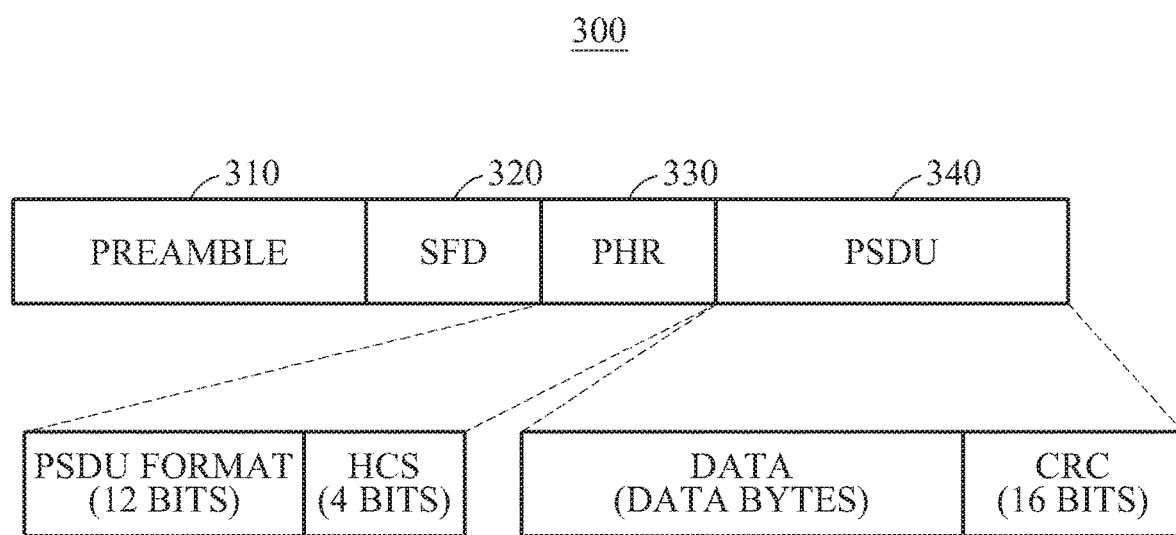
FIG. 3 illustrates an example of a packet.

FIG. 3 illustrates an example of a packet 300.

The packet 300 includes a preamble 310, a start frame delimiter (SFD) 320, a physical layer header (PHR) 330, and a physical layer service data unit (PSDU) 340. The PSDU 340 is a unit of uncoded data transferred from an upper layer of a physical layer as bits, and is a payload.

In this disclosure, the term "packet" is interchangeable with the term "frame".

The preamble 310 is a bit string recorded at a head of each frame. The preamble 310 includes a predetermined bit pattern for frame synchronization. For example, the predetermined bit pattern may be a pattern in which all bits are "1".

The SFD 320 identifies a beginning of a frame and a reconfirmation of synchronization.

The PHR 330 is a field including useful information associated with the physical layer. For example, the information includes a length indicator, an applied modulation scheme, and an applied coding scheme. The PHR 330 includes a header check sequence (HCS) and a field related to a form of the PSDU 340. The HCS is used to determine whether an error has occurred in the PHR 330.

The PHR 330 will be described in greater detail with reference to FIG. 10.

The PSDU 340 includes cyclical redundancy check (CRC) value and data to be transmitted by the transmitter 110.

The description provided with reference to FIGS. 1 and 2 is also applicable to FIG. 3, but will not be repeated here for clarity and conciseness.

Figure 4:
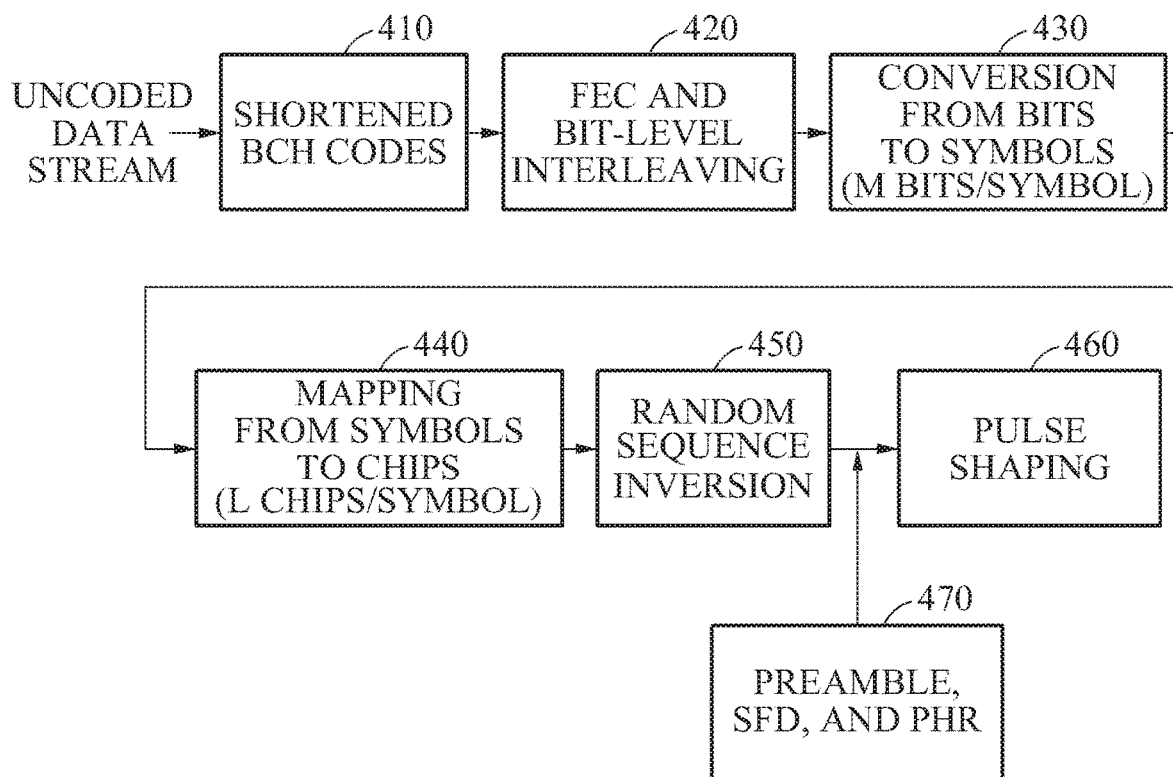
FIG. 4 illustrates an example of a data stream transmission method.

FIG. 4 illustrates an example of a data stream transmission method.

A physical layer receives a PSDU from an upper layer of the physical layer. A baseband processing of operations 410 through 460 is performed on the PSDU before radio frequency (RF) processing and transmission.

In operation 410, the processor 220 encodes the PSDU using a shortened Bose, Chaudhuri, and Hocquenghem (BCH) code to protect data against channel induced errors and ensure uniform error protection across the data.

In operation 420, the processor 220 performs forward error correction (FEC) coding on the encoded PSDU and performs bit-level interleaving on the FEC-coded PSDU to generate an interleaved bitstream to minimize a bit error in an event of symbol errors.

In operation 430, the processor 220 converts the bits in the interleaved bitstream from 420 into symbols.

In operation 440, the processor 220 converts each symbol from 430 into a sequence of chips by performing a symbol-to-chip mapping to enhance robustness against channel noise and interference. Each chip is a signal. The sequence of the chips is a spreading sequence. Sequences corresponding to a plurality of symbols are orthogonal. For example, the sequence may be expressed in a ternary scale using "−1", "0", and "1".

In operation 450, the processor 220 inverts a polarity of the spreading sequence from 440 in a random fashion to remove harmonic components and a direct current (DC) component in a transmitted signal, thereby producing a smooth continuous power spectral density (PSD). Operation 450 is performed at a rate of a chip clock.

In operation 460, the processor 220 performs pulse shaping on the inverted spreading sequence to limit out-of-band emissions.

The communicator 210 transmits a data stream by transmitting the pulse-shaped inverted spreading sequence to the receiver 120.

Additionally, operation 470 may be performed in advance of operation 460.

In operation 470, the processor 220 adds a preamble, an SFD, and a PHR to the inverted spreading sequence.

In operation 460, the processor 220 performs pulse shaping on the preamble, the SFD, and the PHR, and the inverted spreading sequence.

Through operations 410 to 470, the data stream is transmitted to the receiver 120.

The description provided with reference to FIGS. 1 through 3 is also applicable to FIG. 4, but will not be repeated here for clarity and conciseness.

Figure 5:
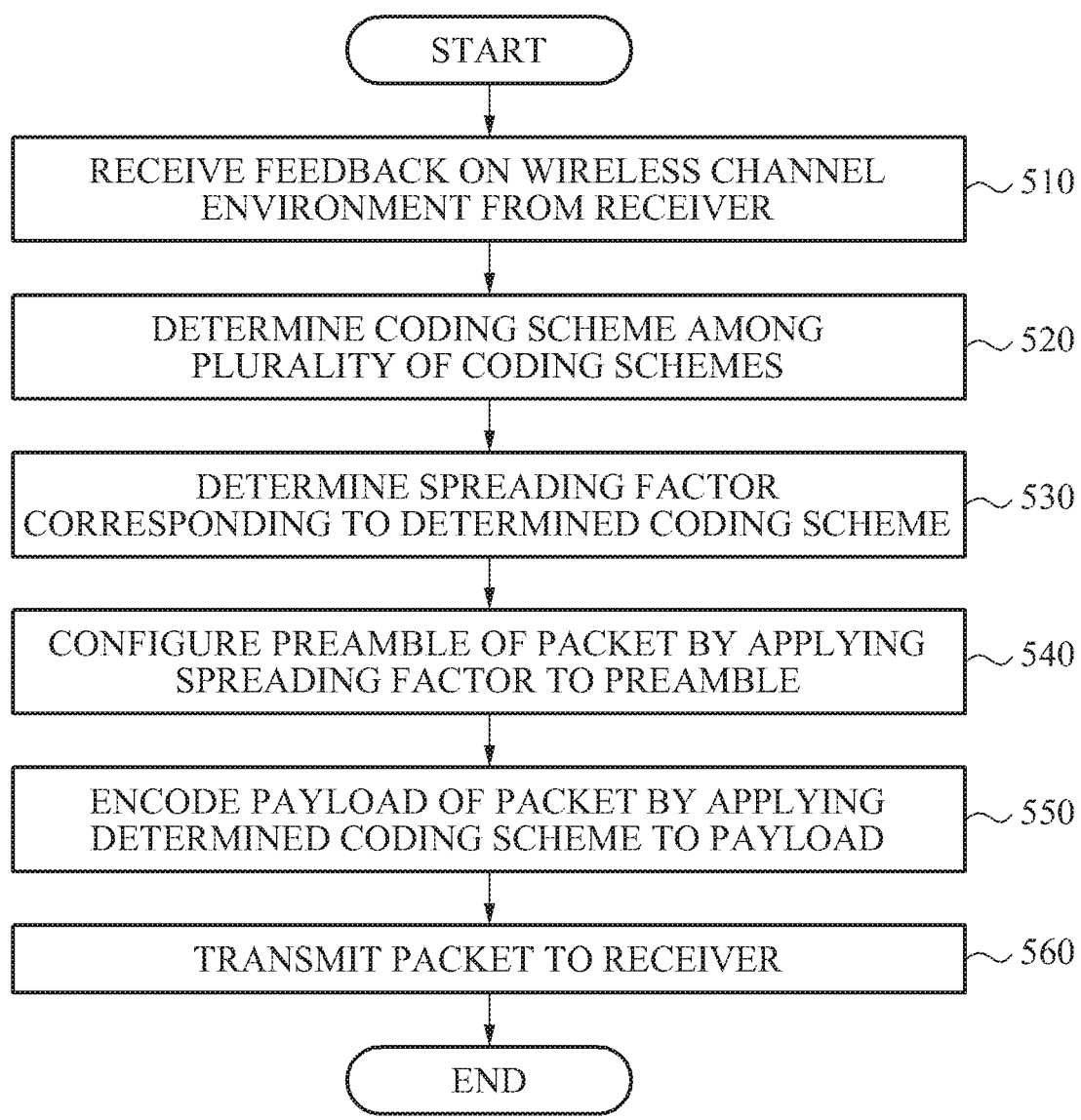
FIG. 5 illustrates an example of a packet transmission method.

FIG. 5 illustrates an example of a packet transmission method.

Operations 520 through 550 correspond to related operations among operations 410 through 470 of FIG. 4. Thus, operations 410 through 470 may be performed by performing operations 520 through 550. For example, operations 520 and 550 correspond to operation 410, and operations 530 and 540 correspond to operation 470.

In operation 510, the communicator 210 receives feedback on a wireless channel environment from the receiver 120. The feedback includes information associated with any one or more of a signal to noise ratio (SNR), a channel quality indicator (Cal), and a data rate at which the receiver 120 receives a packet.

In one example, operation 510 is performed selectively. For example, when the receiver 120 is included in a wireless channel environment enabling transmission of feedback, the communicator 210 receives feedback on the wireless channel environment from the receiver 120.

In another example, operation 510 is performed. For example, when the receiver 120 is included in a wireless channel environment that does not enable transmission of feedback, the communicator 210 does not receive feedback on the wireless channel environment from the receiver 120.

When the communicator 210 does not receive the feedback, the communicator 210 sets a coding scheme again based on the wireless channel environment. For example, the communicator 210 selects a coding scheme appropriate for a wireless channel status.

In operation 520, the processor 220 determines a coding scheme among a plurality of coding schemes based on the wireless channel environment.

In one example, the processor 220 determines one of a plurality of coding schemes based on the feedback received from the receiver 120. For example, the plurality of coding schemes include a coding scheme using BCH codes and a coding scheme using single parity check (SPC) codes. Hereinafter, the coding scheme using BCH codes will be referred to as a BCH scheme, and the coding scheme using SPC codes will be referred to as an SPC scheme.

In another example, when the communicator 210 does not receive the feedback, the processor 220 sets a coding scheme again based on the wireless channel environment.

In a case of a modulation scheme, the processor 220 determines one of a plurality of modulation schemes based on the wireless channel environment. For example, the plurality of modulation schemes include 1/1-TOOK (Ternary On-Off Keying), 2/4-TOOK, 3/8-TOOK, and 5/32-TOOK, all of which are well known to one of ordinary skill in the art and thus will not be described in detail here. In this disclosure, the term "Ternary On-Off Shift Keying (TOOK)" is interchangeable with the term "Ternary Amplitude Shift Keying (TASK)".

The plurality of TOOK modulation schemes are denoted as M/L-TOOK, where M denotes a number of bits mapped to one symbol, and L denotes a number of chips used for one symbol.

In operation 530, the processor 220 determines a spreading factor corresponding to the determined coding scheme. The spreading factor is a factor used to convert a bit or a symbol into a sequence of chips. For example, the spreading factor may be "4" or "8". When the spreading factor is "4", the sequence of chips obtained by converting one bit or one symbol includes four chips. When the spreading factor is "8", the sequence of chips obtained by converting one bit or one symbol includes eight chips.

The spreading factor is set in advance for each of the plurality of coding schemes. In one example, a spreading factor for the SPC scheme is set to "4", and the spreading factor for the BCH scheme is set to "8".

The transmitter 110 and the receiver 120 share information on the spreading factor set for each of the plurality of coding schemes. Thus, the transmitter 110 and the receiver share information on a spreading factor of the determined coding scheme. For example, the transmitter 110 and the receiver 120 share a mapping table mapping the spreading factors to the coding schemes.

In a case of the modulation, for example, a spreading factor corresponding to 1/1-TOOK and 2/4-TOOK is "4" or "8", and a spreading factor corresponding to 3/8-TOOK and 5/32-TOOK is "8".

In operation 540, the processor 220 configures a preamble of the packet by applying the spreading factor corresponding to the determined coding scheme to the preamble. The preamble includes a base preamble sequence set according to the spreading factor.

Spreading sequences corresponding to a plurality of spreading factors corresponding to the plurality of coding schemes are orthogonal, meaning that the plurality of spreading sequences are uncorrelated with one another, such that correlation values between the plurality of spreading sequences are "0". For example, a first spreading sequence indicating a bit "1" for the SPC scheme and a second spreading sequence indicating a bit "1" for the BCH scheme are orthogonal, such that a correlation value between the first spreading sequence and the second spreading sequence is "0".

In operation 550, the processor 220 encodes a payload of the packet by applying the determined coding scheme to the payload. For example, the processor 220 encodes a PSDU by applying the determined coding scheme to the PSDU.

In a case of the modulation, the processor 220 modulates the payload of the packet by applying the determined modulation scheme to the payload.

Although FIG. 5 illustrates that operation 550 is performed subsequent to operation 540, operation 550 may also be performed in parallel with operations 530 and 540. In one example, the processor 220 performs operation 550 while performing operations 530 and 540. In another example, operations 530 and 540 may be performed subsequent to operation 550.

After operation 550 is performed, the processor 220 combines the payload with the preamble, the SFD, and the PHR.

The PHR includes an indicator indicating a coding scheme.

The processor 220 marks the determined coding scheme in the indicator.

In operation 560, the communicator 210 transmits the packet including the preamble, the SFD, the PHR, and the payload to the receiver 120. The packet may be transmitted using RF processing and transmission. For example, pulse shaping may be performed on the packet.

The description provided with reference to FIGS. 1 through 4 is also applicable to FIG. 5, but will not be repeated here for clarity and conciseness.

Figure 6:
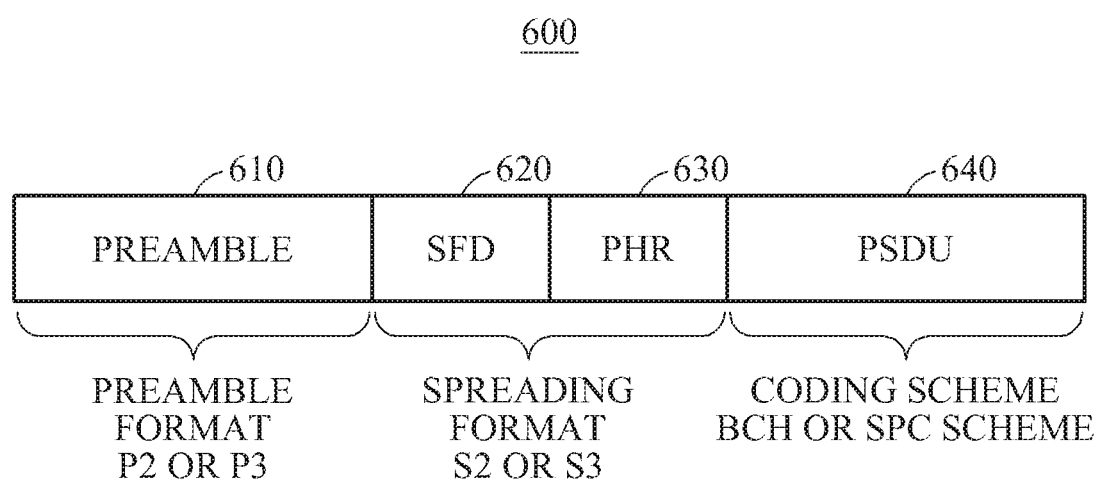
FIG. 6 illustrates an example of a packet to be transmitted.

FIG. 6 illustrates an example of a packet 600 to be transmitted.

A preamble 610 of the packet 600 has a preamble format in which a spreading factor corresponding to a determined coding scheme is applied to a base preamble sequence. In one example, the preamble format is P2 corresponding to a spreading factor of "4". In another example, the preamble format is P3 corresponding to a spreading factor of "8".

Each of an SFD 620 and a PHR 630 of the packet 600 has a spreading format in which the spreading factor corresponding to the determined coding scheme is applied to each of the SFD 620 and the PHR 630. In one example, the spreading format is S2 corresponding to the spreading factor of "4". In another example, the spreading format is S3 corresponding to the spreading factor of "8".

A coding scheme applied to a PSDU 640 of the packet 600 is a BCH scheme or an SPC scheme.

The description provided with reference to FIGS. 1 through 5 is also applicable to FIG. 6, but will not be repeated here for clarity and conciseness.

Figure 7:
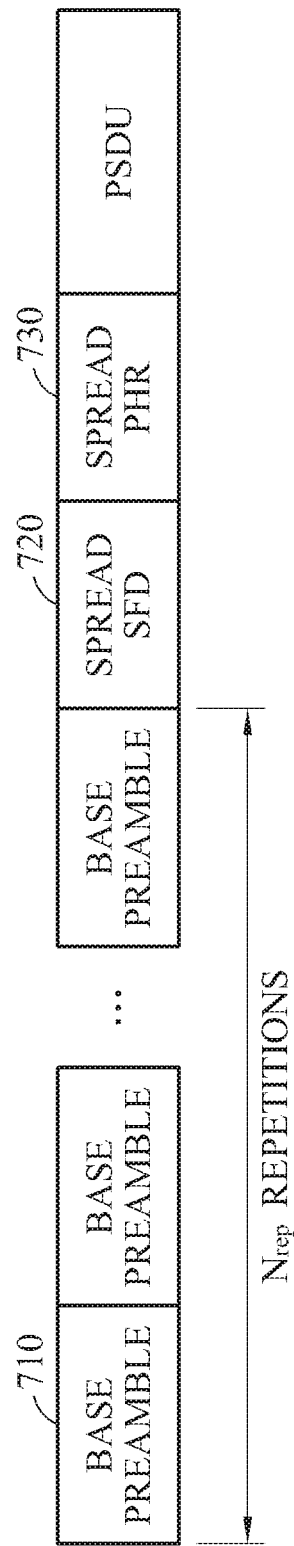

FIGS. 7 and 8 illustrates examples of a sequence of a preamble configured according to a spreading factor.

Different preambles are defined to support multiple data rates and coding schemes to maximize energy efficiency of a PSDU.

In this example, the preamble includes a base preamble sequence of 32 chips. The preamble may include $N_{rep}$ repetitions of the base sequence. A bit corresponding to a first position in a base preamble sequence may be a base preamble.

In one example, a base preamble sequence including 32 chips is used in a preamble format P2. In the preamble format P2, an entire preamble has a structure in which the base preamble sequence is repeated four times corresponding to a spreading factor of "4". In a non-coherent receiver incapable of verifying a positive sign and a negative sign of a sequence, a preamble sequence may have a structure in which a base preamble sequence having a period corresponding to a spreading factor, for example, a base preamble sequence having a period of "4" corresponding to a spreading factor of "4", is repeated 32 times.

In another example, a base preamble sequence including 32 chips is used in a preamble format P3. The base preamble sequence used in the preamble format P3 is different from the base preamble sequence used in the preamble format P2. In the preamble format P3, an entire preamble has a structure in which the base preamble sequence is repeated eight times. In the non-coherent receiver, a preamble sequence may have a structure in which a base preamble sequence having a period corresponding to a spreading factor, for example, a base preamble sequence having a period of "8" corresponding to a spreading factor of "8", is repeated 32 times.

Based on a spreading factor and a base preamble sequence that are used, two different preambles, in this example, the preambles having the formats P2 and P3, are defined.

Each base preamble sequence corresponds to a different spreading factor, and accordingly a base preamble sequence may be set according to a spreading factor.

Base preamble sequences corresponding to a plurality of different spreading factors corresponding to a plurality of coding schemes are orthogonal, meaning that the plurality of base preamble sequences are uncorrelated with one another, such that correlation values between the plurality of base preamble sequences are "0".

For example, in FIG. 8, a correlation value between the base preamble sequence of the preamble format P2 and the base preamble sequence of the preamble format P3 is "0".

A spread SFD 720 and a spread PHR 730 are values obtained by spreading an SFD and a PHR based on a spreading sequence, respectively.

The spread SFD 720 and the spread PHR 730 will be described in greater detail with reference to FIG. 9.

The description provided with reference to FIGS. 1 through 6 are is applicable to FIGS. 7 and 8, but will not be repeated here for clarity and conciseness.

FIG. 9 illustrates an example of spreading sequences of an SFD and a PHR based on a spreading factor.

Based on an applied spreading factor, two different combinations of a spreading factor and a spreading sequence, in this example, S2 and S3, are defined as the spreading formats of the SFD and the PHR. For example, the spreading formats of the SFD and the PHR are referred to as S2 and S3, respectively.

Based on the two different combinations of a spreading factor and a spreading sequence, the spread SFD 720 and the spread PHR 730 are generated.

The description provided with reference to FIGS. 1 through 8 is also applicable to FIG. 9, but will not be repeated here for clarity and conciseness.

Figure 10:
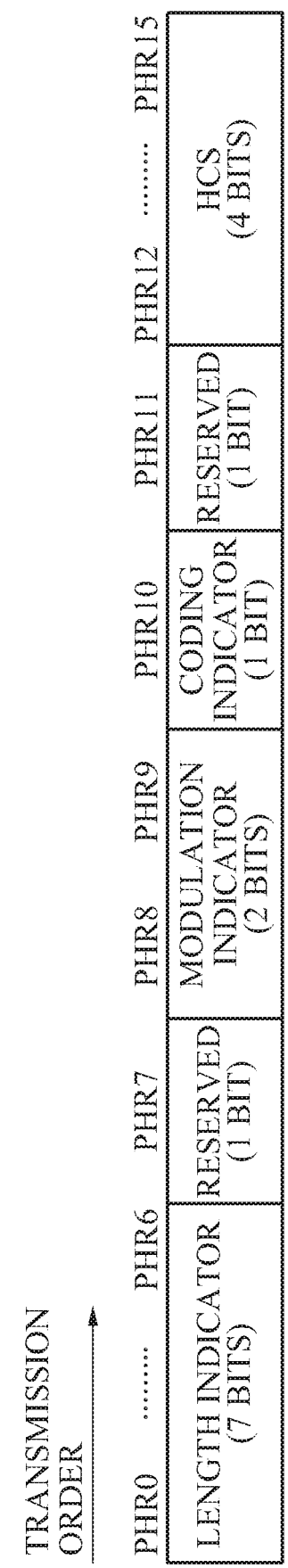
FIG. 10 illustrates an example of a PHR.

FIG. 10 illustrates an example of a PHR.

The PHR 330 includes useful information associated with a form of the PSDU 340. The useful information includes, for example, a length indicator, a modulation indicator, and a coding indicator.

The length indicator indicates a length of the PSDU 340. In this example, the length indicator is seven bits indicating a length in a range from 0 to 127 bytes, with a least significant bit (LSB) being a first bit in a transmission sequence.

The modulation indicator indicates a modulation scheme applied to the PSDU 340. In this example, the modulation indicator is two bits.

The coding indicator indicates a coding scheme applied to the PSDU 340. In this example, the coding indicator is one bit.

A combination of the modulation indicator and the coding indicator is referred to as a transmission format indicator (TFI). The TFI indicates an MCS of the PSDU 340.

An HCS is used to determine whether an error has occurred in the PHR 330. The HCS may be generated by applying a two's complement method to the bits of the PHR 330 excluding the bits of the HCS based on a generator polynomial expressed by Equation 1 below. However, this is merely one example, and other generator polynomials may be used.

$$g(x)=1+x+x^4 \quad (1)$$

FIG. 11 illustrates an example of a modulation indicator indicating a modulation scheme applied to a packet.

In this example, the modulation indicator is the ninth and tenth bits of the PHR 330. For example, the modulation indicator is PHR8 and PHR9.

In this example, four modulation schemes are indicated using a 2-bit modulation indicator. The four modulation schemes include, for example, 1/1-TOOK, 2/4-TOOK, 3/8-TOOK, and 5/32-TOOK.

The description provided with reference to FIGS. 1 through 10 is also applicable to FIG. 11, but will not be repeated here for clarity and conciseness.

Figure 12:
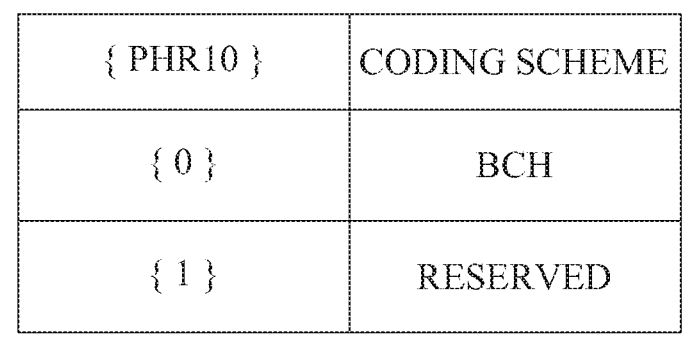

FIG. 12 illustrates an example of a coding indicator indicating a coding scheme applied to a packet.

In this example, the coding indicator is the eleventh bit of the PHR 330. In this example, the coding indicator is PHR10.

In this example, two coding schemes are indicated using a 1-bit coding indicator. In one example, a coding scheme corresponding to "0" is a BCH scheme, and "1" is reserved, i.e., there is no coding scheme corresponding to "1". In another example, the coding scheme corresponding to "0" is the BCH scheme, and a coding scheme corresponding to "1" is an SPC scheme (not shown in FIG. 12).

The description provided with reference to FIGS. 1 through 11 are is applicable to FIG. 12, but will not be repeated here for clarity and conciseness.

FIG. 13 illustrates an example of data rates corresponding to combinations of a modulation scheme, an SFD/PHR spreading format, and a preamble format for a BCH scheme.

FIG. 13 illustrates an example of data rates at 2.4 gigahertz (GHz) and 900 megahertz (MHz). Chip rates at 2.4 GHz and 900 MHz are one megachip per second (Mcps) and 600 kilochips per second (kcps), respectively. FIG. 13 also illustrates examples of an SFD/PHR spreading format and a preamble format used for the above data rates.

In one example, data rates of D3 and D6 in FIG. 13 are used to provide a higher data rate for a control frame. Examples of a control frame include a beacon frame, an acknowledgement frame, and a media access control (MAC) command frame.

The description provided with reference to FIGS. 1 through 12 is also applicable to FIG. 13, but will not be repeated here for clarity and conciseness.

FIG. 14 illustrates an example of data rates corresponding to combinations of a modulation scheme, an SFD/PHR spreading format, and a preamble format for an SPC scheme.

In one example, an optional coding scheme is applied. The optional coding scheme is indicated in the reserved field of the coding indicator of FIG. 12. For example, referring to FIGS. 14, D8 and D9 are included as optional data rates by applying an SPC scheme to a PSDU to support higher data rates.

Since the SPC scheme has a code rate higher than a code rate of a BCH scheme, the above PSDU formats, for example, D8 and D9, may be applied to provide the higher data rates shown in FIG. 14.

The description provided with reference to FIGS. 1 through 13 is also applicable to FIG. 14, but will not be repeated here for clarity and conciseness.

Figure 15:
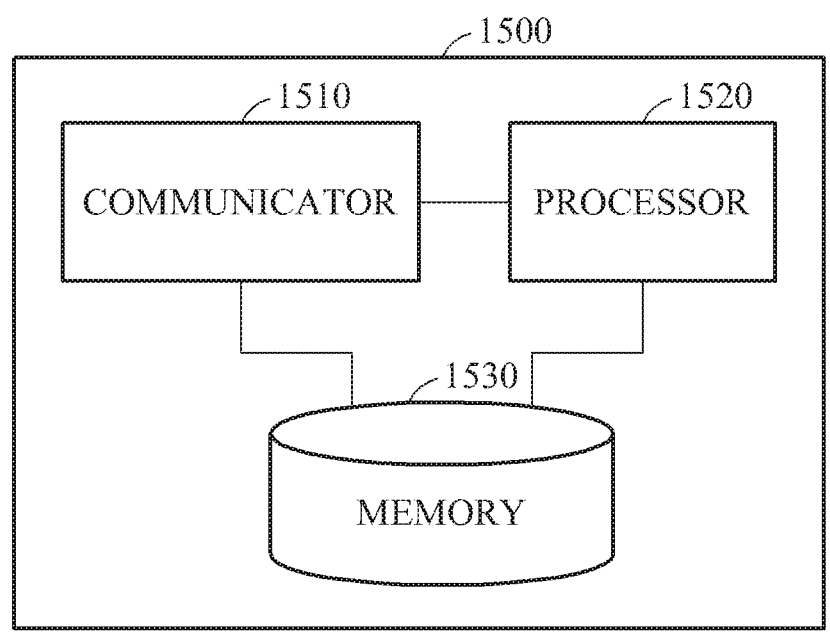
FIG. 15 illustrates an example of a configuration of a receiver.

FIG. 15 illustrates an example of a configuration of a receiver 1500.

The receiver 1500 includes a communicator 1510, a processor 1520, and a memory 1530. The receiver 1500 corresponds to the receiver 120 of FIG. 1. Thus, the description of the receiver 120 is also applicable to the receiver 1500, but will not be repeated here for clarity and conciseness.

In an example, the receiver 1500 may correspond to the transmitter 110 described above. For example, the communicator 210 may correspond to a communicator 1510, the processor 220 may correspond to a processor 1520, and the memory 230 may correspond to a memory 1530. Although a packet decoding method of the receiver 1500 is described below with reference to FIGS. 15 through 20, the receiver 1500 may also perform the packet transmission method performed by transmitter 110 as described with reference to FIGS. 1 through 14.

The communicator 1510, the processor 1520, and the memory 1530 will be described in greater detail with reference to FIGS. 16 through 20.

The description provided with reference to FIGS. 1 through 14 is also applicable to FIG. 15, but will not be repeated here for clarity and conciseness.

Figure 16:
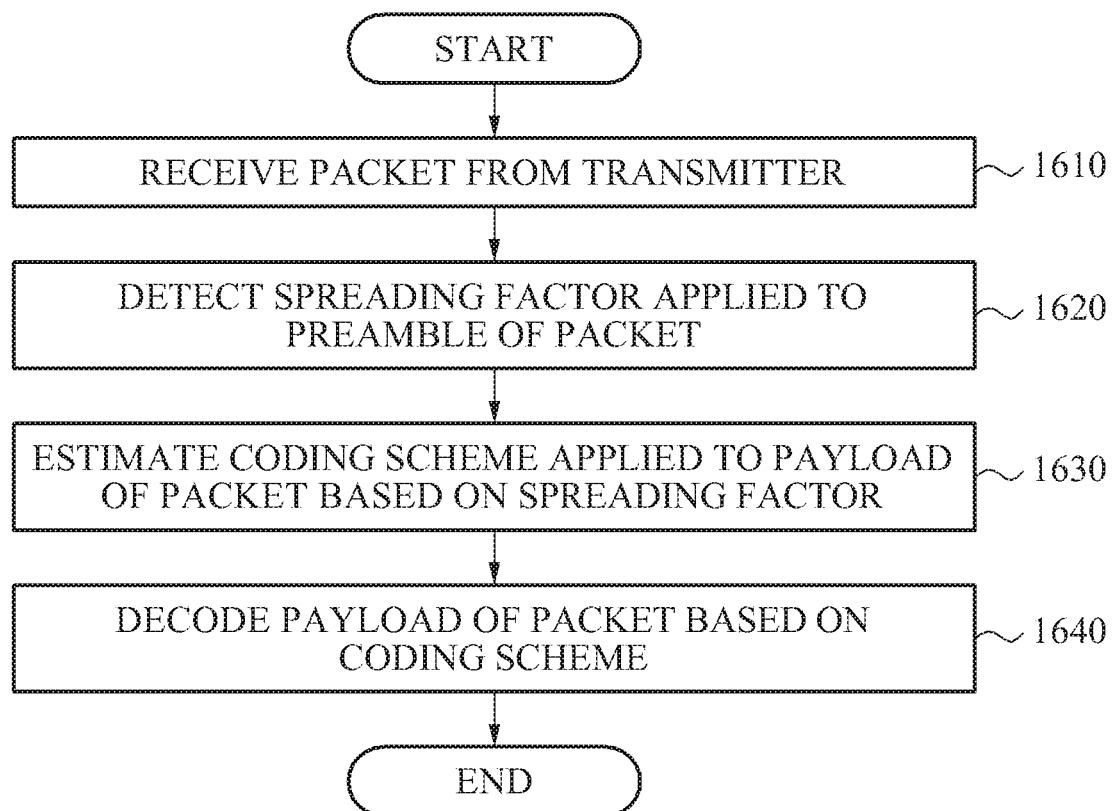
FIG. 16 illustrates an example of a packet decoding method.

FIG. 16 illustrates an example of a packet decoding method.

In operation 1610, the communicator 1510 receives a packet from the transmitter 110. For example, the received packet is a packet to which either one or both of a coding scheme and a modulation scheme is applied. In this example, the received packet is the packet 600 of FIG. 6.

In operation 1620, the processor 1520 detects a spreading factor applied to the preamble 610 of the packet 600.

Operation 1620 will be described in greater detail with reference to FIG. 17.

The processor 1520 detects the spreading factor using a preamble sequence of the preamble 610.

In operation 1630, the processor 1520 estimates a coding scheme applied to a payload of the packet 600 based on the detected spreading factor. In this example, the payload is the PSDU 640. For example, the processor 1520 performs a de-mapping on the coding scheme mapped to the detected spreading factor using a mapping table.

In a case of a modulation, the processor 1520 estimates a modulation scheme applied to the payload of the packet 600 based on the detected spreading factor.

In operation 1640, the processor 1520 decodes the payload of the packet 600 based on the estimated coding scheme. The processor 1520 decodes the payload based on a decoding scheme corresponding to the coding scheme.

In a case of the modulation, the processor 1520 demodulates the payload of the packet based on the estimated modulation scheme.

The packet decoding method will be described in greater detail with reference to FIGS. 17 through 20, and the description is also applicable to a packet demodulation method. Thus, in this description, coding is interchangeable with modulation, and decoding is interchangeable with demodulation.

The description provided with reference to FIGS. 1 through 15 is also applicable to FIG. 16, but will not be repeated here for clarity and conciseness.

Figure 17:
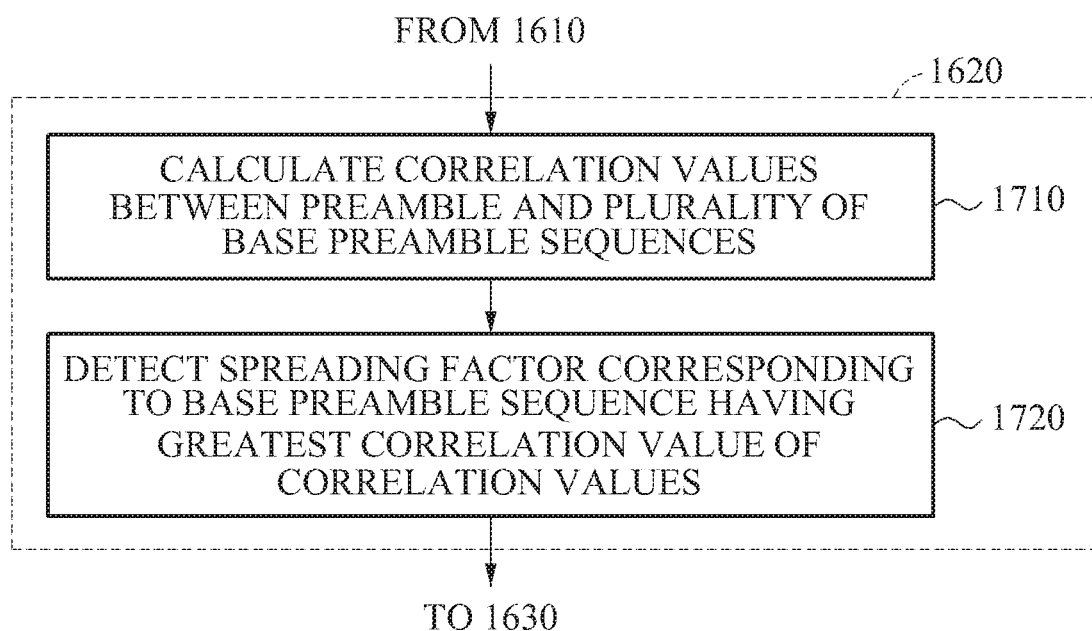
FIG. 17 illustrates an example of a spreading factor detection method.

FIG. 17 illustrates an example of a spreading factor detection method.

Operation 1620 of FIG. 16 includes operations 1710 and 1720.

In operation 1710, the processor 1520 calculates correlation values between a preamble and a plurality of base preamble sequences respectively corresponding to a plurality of spreading factors.

In one example, the plurality of base preamble sequences are orthogonal, meaning that the plurality of base preamble sequences are uncorrelated with one another, such that correlation values between the plurality of base preamble sequences are "0". This will cause the correlation value between the preamble and the base preamble sequence that was used to generate the preamble to be significantly greater than the correlation values between the preamble and the other ones of the plurality of base preamble sequences that were not used to generate the preamble.

When noise is included in a received packet, the noise may also be included in a preamble of the received packet.

In consideration of the noise, the processor 1520 calculates each of the correlation values between the preamble and the plurality of the base preamble sequences.

For example, when a preamble including noise is r, and the plurality of base preamble sequences are c1 and c2, r*c1 and r*c2 are obtained as a result of the calculating of the correlation values. The operator * denotes a correlation operation.

In operation 1720, the processor 1520 detects a spreading factor corresponding to a base preamble sequence having a greatest correlation value of the calculated correlation values.

The description provided with reference to FIGS. 1 through 16 is also applicable to FIG. 17, but will not be repeated here for clarity and conciseness.

Figure 18:
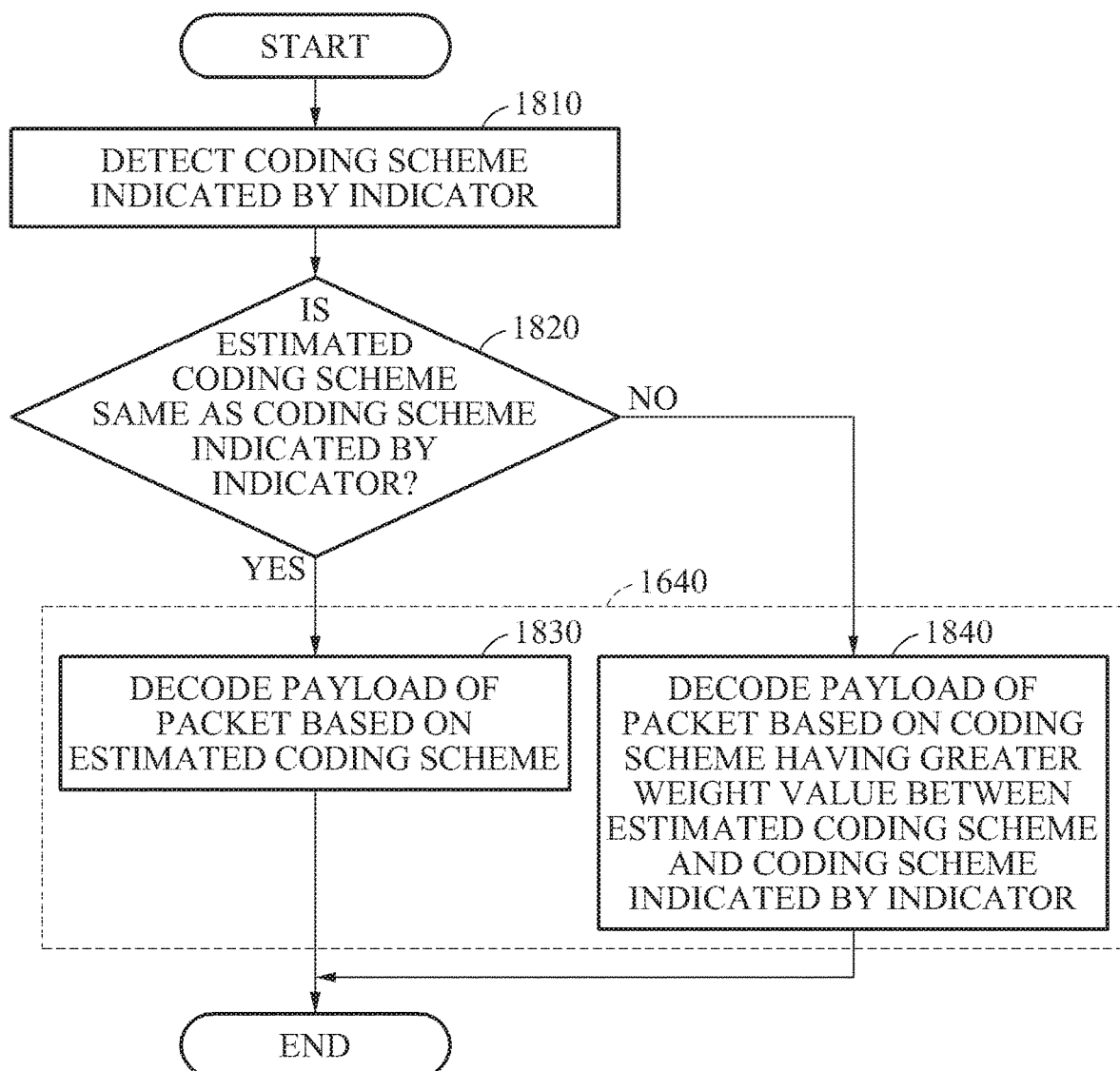
FIG. 18 illustrates an example of a method of determining a coding scheme for use in decoding based on an indicator.

FIG. 18 illustrates an example of a method of determining a coding scheme for use in decoding based on an indicator.

In this example, operation 1810 is performed after operation 1630 in FIG. 16.

In this example, the estimated coding scheme estimated in operation 1630 is a first coding scheme. The first coding scheme is an implicit coding scheme because it is not detected explicitly, but is estimated. i.e., detected implicitly, from the preamble.

The packet 600 includes an indicator indicating a second coding scheme. In this example, the indicator is the coding indicator in FIG. 10.

In operation 1810, the processor 1520 detects the second coding scheme indicated by the indicator. When an error occurs in a header including the indicator or in a field of the indicator during a transmission process, the detected second coding scheme may be different from a coding scheme set by the transmitter 110 due to the error. For example, although the transmitter 110 may have set a value indicating a BCH scheme to the indicator, the detected second coding scheme may be an SPC scheme when an error occurs in the header including the indicator or in the field of the indicator. In this example, the header is the PHR 330 in FIG. 10.

In one example, the processor 1520 determines whether an error is present in the header including the indicator. When an error is not present in the header, the processor 1520 detects the second coding scheme. The second coding scheme is an explicit coding scheme because it is explicitly detected from the coding indicator.

In operation 1820, the processor 1520 determines whether the first coding scheme is the same as the second coding scheme.

When the first coding scheme is the same as the second coding scheme, operation 1830 is performed. When the first coding scheme is not the same as the second coding scheme, operation 1840 is performed.

In this example, operation 1640 in FIG. 16 includes operations 1830 and 1840.

In operation 1830, when the first coding scheme is the same as the second coding scheme, the processor 1520 decodes the payload of the packet 600 based on the first coding scheme.

Thus, when the first coding scheme is the same as the second coding scheme, the estimated coding scheme is treated as an explicit coding scheme, and is used to decode the payload of the packet 600.

In operation 1840, when the first coding scheme is not the same as the second coding scheme, the processor 1520 decodes the payload of the packet 600 based on a coding scheme having a greater weight value between the first coding scheme and the second coding scheme. The weight value may be set in advance.

In one example, a weight value is set in advance to be greater for the first coding scheme than for the second coding scheme.

In another example, the weight value is set in advance to be greater for either the BCH scheme or the SPC scheme.

A plurality of items of information on the indicator and the spreading factor may be used to estimate the coding scheme, thereby increasing an accuracy level of the estimated coding scheme. Increasing the accuracy level of the estimated coding scheme will reduce the number of times the signal processing in operation 1840 needs to be performed, thereby reducing power consumption.

The description provided with reference to FIGS. 1 through 17 is also applicable to FIG. 18, but will not be repeated here for clarity and conciseness.

Figure 19:
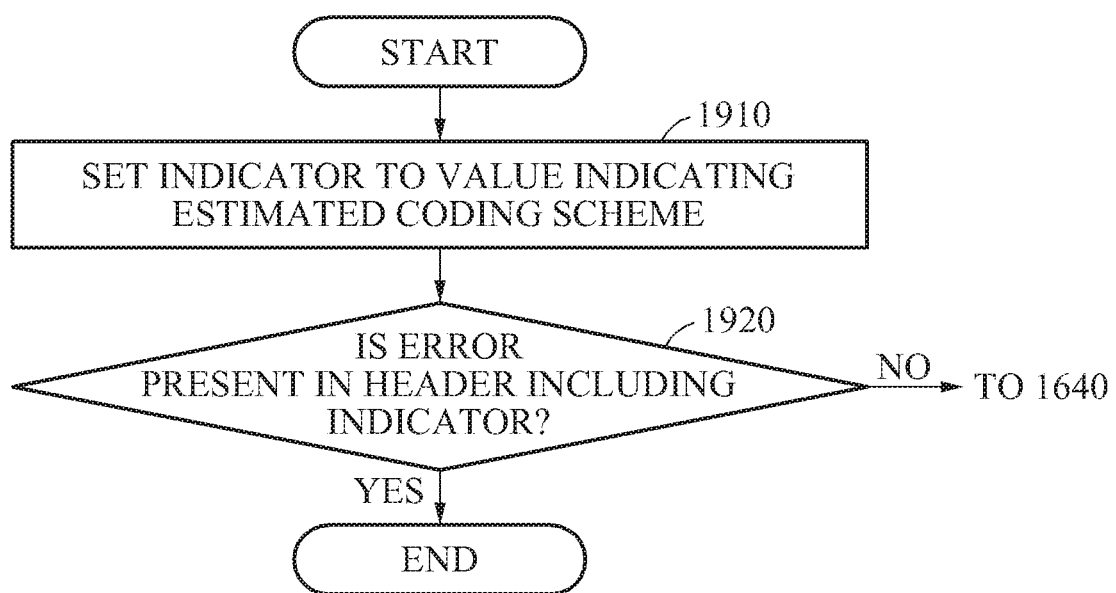
FIG. 19 illustrates an example of a method of verifying an estimated coding scheme.

FIG. 19 illustrates an example of a method of verifying an estimated coding scheme.

Operation 1910 is performed after operation 1630 in FIG. 16.

The packet 600 includes an indicator indicating a coding scheme applied to a payload of the packet 600 by the transmitter 110. In this example, the indicator is the coding indicator in FIG. 10.

In operation 1910, the processor 1520 sets the indicator to a value indicating the estimated coding scheme.

In operation 1920, the processor 1520 determines whether an error is present in a header including the indicator set to the value indicating the estimated coding scheme. In this example, the processor 1520 determines whether an error is present in the header based on the HCS included in the PHR 330 in FIG. 10.

When an error is not present in the header, operation 1640 is performed.

When the error is present in the header, the processor 1520 suspends decoding of the packet 600.

The description provided with reference to FIGS. 1 through 18 is also applicable to FIG. 19, but will not be repeated here for clarity and conciseness.

Figure 20:
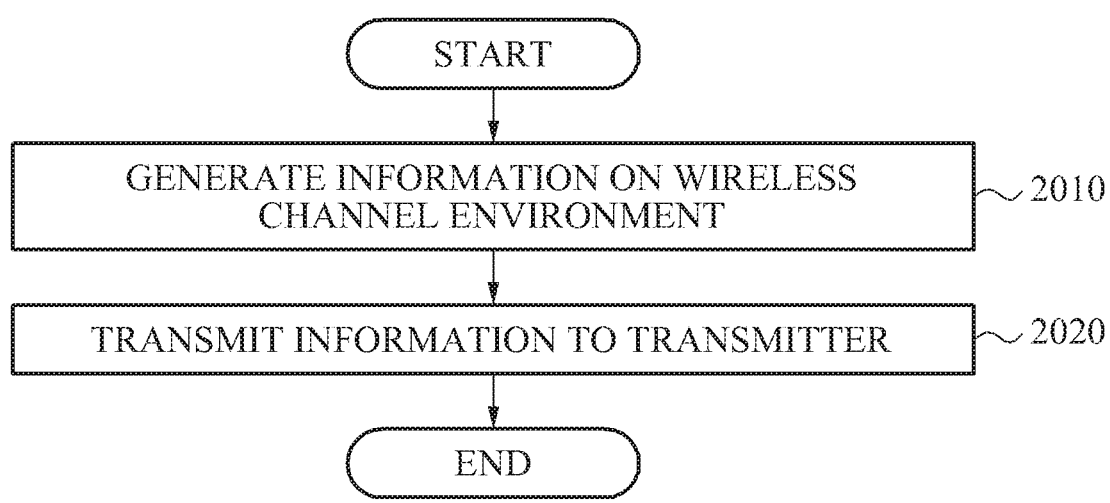
FIG. 20 illustrates an example of a method of transmitting information on a wireless channel environment to a transmitter.

FIG. 20 illustrates an example of a method of transmitting information on a wireless channel environment to a transmitter.

Operations 2010 and 2020 are performed subsequent to operation 1610 described above, and are performed in parallel with operations 1620 through 1640.

In operation 2010, the processor 1520 generates information on a wireless channel environment in which the packet 600 was transmitted. The information includes one or more of a data rate, a CQI, and an SNR. The generated information constitutes a feedback on the wireless channel environment.

In operation 2020, the communicator 1510 transmits the generated information to the transmitter 110.

The description provided with reference to FIGS. 1 through 19 is also applicable to FIG. 20, but will not be repeated here for clarity and conciseness.

FIG. 21 illustrates an example of a packet coding method.

In operation 2110, the processor 220 stores information on a plurality of coding schemes that may be applied to the packet 600 in the memory 230.

In operation 2120, in one example, the processor 220 sets a different spreading factor for each of the plurality of coding schemes. For example, a plurality of different predetermined spreading factors are set for a plurality of predetermined coding schemes by respectively mapping the plurality of different spreading factors to the plurality of coding schemes.

In one example, the communicator 210 receives a plurality of different spreading factors to be set for the plurality of coding schemes from a user of the transmitter 110. The processor 220 respectively sets the received plurality of different spreading factors for the plurality of coding schemes so that a different one of each of the received plurality of different spreading factors is set for each of the plurality of coding schemes.

In operation 2130, the processor 220 encodes a payload of the packet 600 by applying to the payload a coding scheme determined among the plurality of coding schemes based on a wireless channel environment.

In operation 2140, the processor 220 configures a preamble of the packet 600 by applying to the preamble the spreading factor set for the coding applied to the preamble.

The coding scheme to be applied to the packet 600 may be changed based on the wireless channel environment so that a spreading factor corresponding to the coding scheme is applied to the packet 600. By applying a coding scheme appropriate for the wireless channel environment, either one or both of a throughput and a data rate may be improved. The coding scheme to be applied to the packet 600 may be one of the plurality of coding schemes that provides a maximum throughput in the wireless channel environment.

For example, a first code rate of a first coding scheme may be similar to a second code rate of a second coding scheme different from the first coding scheme. When the first coding scheme is more appropriate for high speed transmission than the first coding scheme in view of a complexity, a smaller spreading factor may be applied to the preamble of the first coding scheme, thereby increasing a throughput and an overall transmission efficiency. The preamble having the smaller spreading factor will include a smaller number of base preamble sequences.

In one example, the throughput may be improved by reducing a size of the spreading factor applied to the preamble.

Although the description of FIG. 21 refers to a packet coding method, the description is also applicable to a packet modulation method. Thus, in this description, coding is interchangeable with modulation.

The description provided with reference to FIGS. 1 through 20 is also applicable to FIG. 20, but will not be repeated here for clarity and conciseness.

The transmitter 110 and the receiver 120 in FIG. 1, the communicator 210, the processor 220, and the memory 230 in FIG. 2, the communicator 1510, the processor 1520, and the memory 1530 in FIG. 15 that perform the various operations described with respect to FIGS. 1-21 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

While this disclosure includes specific examples, it will be apparent to one of ordinary skill in the art that various changes in form and detail may be made in these examples without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
one or more processors configured to:
  generate a preamble;
  spread a SFD (start frame delimiter) based on a bit-to-sequence mapping, wherein a first bit in the SFD is mapped to a first ternary sequence and a second bit in the SFD is mapped to a second ternary sequence;
  spread a PHR (physical layer Header) based on the bit-to-sequence mapping;
  generate a sequence of chips based on a PSDU (physical service data unit);
  concatenate the generated preamble, the spread SFD, the spread PHR, and the generated sequence; and
  transmit, to a receiver, a signal generated based on a result of the concatenating,
  wherein the generated preamble includes a ternary base sequence of length 32 chips repeated 8 times, and
  wherein the ternary base sequence is [1 0—1 0 0—1 0—1 1 0 1 0 0—1 0 1 1 0 1 0 0—1 0 1—1 0 1 0 0 1 0 1].

2. The electronic device of claim 1, wherein the one or more processors are further configured to spread 0 in the SFD into [0—1 0 1 1 0—1 0] and spread 1 in the SFD into [1 0—1 0 0—1 0 1].

3. The electronic device of claim 1, wherein the one or more processor are further configured to spread 0 in the PHR into [0—1 0 1 1 0—1 0] and spread 1 in the PHR into [1 0—1 0 0—1 0 1].

4. The electronic device of claim 1, wherein the one or more processors are further configured to:
  encode the PSDU;
  interleave the encoded PSDU;
  convert a bit stream comprising a result of the interleaving to a data symbol; and
  map the data symbol to the sequence of the chips.

5. An operating method of an electronic device, comprising:
  generating a preamble;
  spreading a SFD (start frame delimiter) based on a bit-to-sequence mapping, wherein a first bit in the SFD is mapped to a first ternary sequence and a second bit in the SFD is mapped to a second ternary sequence;
  spreading a PHR (physical layer Header) based on the bit-to-sequence mapping;
  generating a sequence of chips based on a PSDU (physical service data unit);
  concatenating the generated preamble, the spread SFD, the spread PHR, and the generated sequence; and
  transmitting, to a receiver, a signal generated based on a result of the concatenating,
  wherein the generated preamble includes a ternary base sequence of length 32 chips repeated 8 times, and
  wherein the ternary base sequence is [1 0—1 0 0—1 0—1 1 0 1 0 0—1 0 1 1 0 1 0 0—1 0 1—1 0 1 0 0 1 0 1].

6. The method of claim 5, wherein spreading the SFD comprises spreading 0 in the SFD into [0—1 0 1 1 0—1 0] and spreading 1 in the SFD into [1 0—1 0 0—1 0 1].

7. The method of claim 5, wherein spreading the PHR comprises spreading 0 in the PHR into [0—1 0 1 1 0—1 0] and spreading 1 in the PHR into [1 0—1 0 0—1 0 1].

8. The method of claim 5, wherein the generating of the sequence comprising:
  encoding the PSDU;
  interleaving the encoded PSDU;
  converting a bit stream comprising a result of the interleaving to a data symbol; and
  mapping the data symbol to the sequence of the chips.

* * * * *